США011549165B2

United States Patent
Shukla et al.

(10) Patent No.: US 11,549,165 B2
(45) Date of Patent: Jan. 10, 2023

(54) FUNCTIONALLY GRADED VARIABLE ENTROPY ALLOYS WITH RESISTANCE TO HYDROGEN INDUCED CRACKING

(71) Applicant: Halliburton Energy Services, Inc., Houston, TX (US)

(72) Inventors: Shashwat Shukla, Singapore (SG); Arpana Singh, Singapore (SG); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/343,021

(22) Filed: Jun. 9, 2021

(65) Prior Publication Data
US 2022/0396859 A1    Dec. 15, 2022

(51) Int. Cl.
*B32B 15/01* (2006.01)
*C22C 19/05* (2006.01)
*C22F 1/10* (2006.01)

(52) U.S. Cl.
CPC ............... *C22F 1/10* (2013.01); *B32B 15/01* (2013.01); *C22C 19/057* (2013.01); *Y10T 428/12944* (2015.01)

(58) Field of Classification Search
None
See application file for complete search history.

(56) References Cited

U.S. PATENT DOCUMENTS

| | | |
|---|---|---|
| 2018/0200834 A1 | 7/2018 | Kilmer et al. |
| 2019/0176436 A1* | 6/2019 | Pieronek ............ C21D 8/0205 |
| 2020/0056272 A1 | 2/2020 | Hong et al. |

FOREIGN PATENT DOCUMENTS

| | | | |
|---|---|---|---|
| KR | 10-1910539 | 10/2018 | |
| KR | 10-2019-0028219 | 3/2019 | |
| KR | 10-2021-0065221 | 6/2021 | |
| WO | WO-2015098981 A1 * | 7/2015 | ........... B32B 15/012 |

OTHER PUBLICATIONS

Kumar, Mukul, Wayne E. King, and Adam J. Schwartz. "Modifications to the microstructural topology in fcc materials through thermomechanical processing." Acta Materialia 48.9 (2000): 2081-2091.

(Continued)

*Primary Examiner* — Xiaobei Wang
(74) *Attorney, Agent, or Firm* — Scott Richardson; C. Tumey Law Group PLLC

(57) ABSTRACT

The disclosure provides for a layered metal with resistance to hydrogen induced cracking and method of production thereof, comprising a core metal alloy and a skin metal alloy. The core metal alloy comprises twinned boundaries. The core metal alloy has undergone plastic deformation and a heat treatment. The core metal alloy comprises nickel and cobalt. The skin metal alloy is disposed on the core metal alloy, wherein the skin metal alloy comprises an entropy greater than the core metal alloy. The core metal alloy comprises a greater density of twinned boundaries than the skin metal alloy. The skin metal alloy comprises a stacking fault energy of at least about 50 mJ/m², and the skin metal alloy comprises iron, aluminum, and boron.

20 Claims, 4 Drawing Sheets

(56) References Cited

OTHER PUBLICATIONS

Seita, Matteo, et al. "The dual role of coherent twin boundaries in hydrogen embrittlement." Nature communications 6.1 (2015): 1-6.

Woo, W., et al. "Stacking fault energy analyses of additively manufactured stainless steel 316L and CrCoNi medium entropy alloy using in situ neutron diffraction." Scientific reports 10.1 (2020): 1-15.

Zhang, Ruopeng, et al. "Short-range order and its impact on the CrCoNi medium-entropy alloy." Nature 581.7808 (2020): 283-287.

Zhang, Y. H., et al. "The origin of negative stacking fault energies and nano-twin formation in face-centered cubic high entropy alloys." Scripta Materialia 130 (2017): 96-99.

Ding, Jun, et al. "Tunable stacking fault energies by tailoring local chemical order in CrCoNi medium-entropy alloys." Proceedings of the National Academy of Sciences 115.36 (2018): 8919-8924.

Joseph, Jithin, et al. "Comparative study of the microstructures and mechanical properties of direct laser fabricated and arc-melted $Al_xCoCrFeNi$ high entropy alloys." Materials Science and Engineering: A 633 (2015): 184-193.

Divinski et al., High-Entropy Alloys: Diffusion. Encyclopedia of Materials: Metals and Alloys (2020), doi: 10.1016/B978-0-12-803581-8.11771-0.

Sun, Kun, et al. "Effect of SLM processing parameters on microstructures and mechanical properties of $Al0.5CoCrFeNi$ high entropy alloys." Metals 10.2 (2020): 292.

Moghaddam, Ahmad Ostovari, et al. "Additive manufacturing of high entropy alloys: a practical review." Journal of Materials Science & Technology (2020).

Zhang, C., G. J. Chen, and P. Q. Dai. "Evolution of the microstructure and properties of laser-clad $FeCrNiCoB_x$ high-entropy alloy coatings." Materials Science and Technology 32.16 (2016): 1666-1672.

Luo, Hong, et al. "A strong and ductile medium-entropy alloy resists hydrogen embrittlement and corrosion." Nature communications 11.1 (2020): 1-8.

"Specification Sheet: Alloy 625 (UNS N06625) W. Nr 2.4856" Sandmeyer Steel Company (Jun. 2014), 3 pages. Found at https://www.sandmeyersteel.com/images/alloy-625-spec-sheet.pdf.

"Special Metals—Inconel Alloy 718 (UNS N07718/W.Nr. 2.4668)" Special Metals Corporation (Sep. 2007), 28 pages. Found at http://specialmetals.ir/images/technical_info/nickel%20base/Inconel%20alloy%20718.pdf.

Dwivedi, Sandeep Kumar, and Manish Vishwakarma. "Hydrogen Embrittlement Prevention in High Strength Steels by Application of Various Surface Coatings—A Review." Advances in Manufacturing and Industrial Engineering (2021): 673-683.

Gröner, Lukas, et al. "Investigations of the Deuterium Permeability of As-Deposited and Oxidized $Ti_2AlN$ Coatings." Materials 13.9 (2020): 2085.

International Search Report and Written Opinion for Application No. PCT/US2021/036845, dated Mar. 4, 2022.

\* cited by examiner

FUNCTIONALLY GRADED VARIABLE ENTROPY ALLOYS WITH RESISTANCE TO HYDROGEN INDUCED CRACKING

TECHNICAL FIELD OF THE INVENTION

The present disclosure relates generally to hydrogen induced cracking and, more particularly, to systems and methods for producing a metal alloy with resistance to hydrogen induced cracking.

BACKGROUND

Hydrogen induced cracking (HIC) can cause unexpected fracture of metallic components used in oil and gas operations. A vast majority of metals used in the industry are susceptible to HIC. Despite losses resulting from premature failures, part repairs, and replacements, high strength metallic alloys specifically designed for HIC-prone environments are not available.

Figure 1:
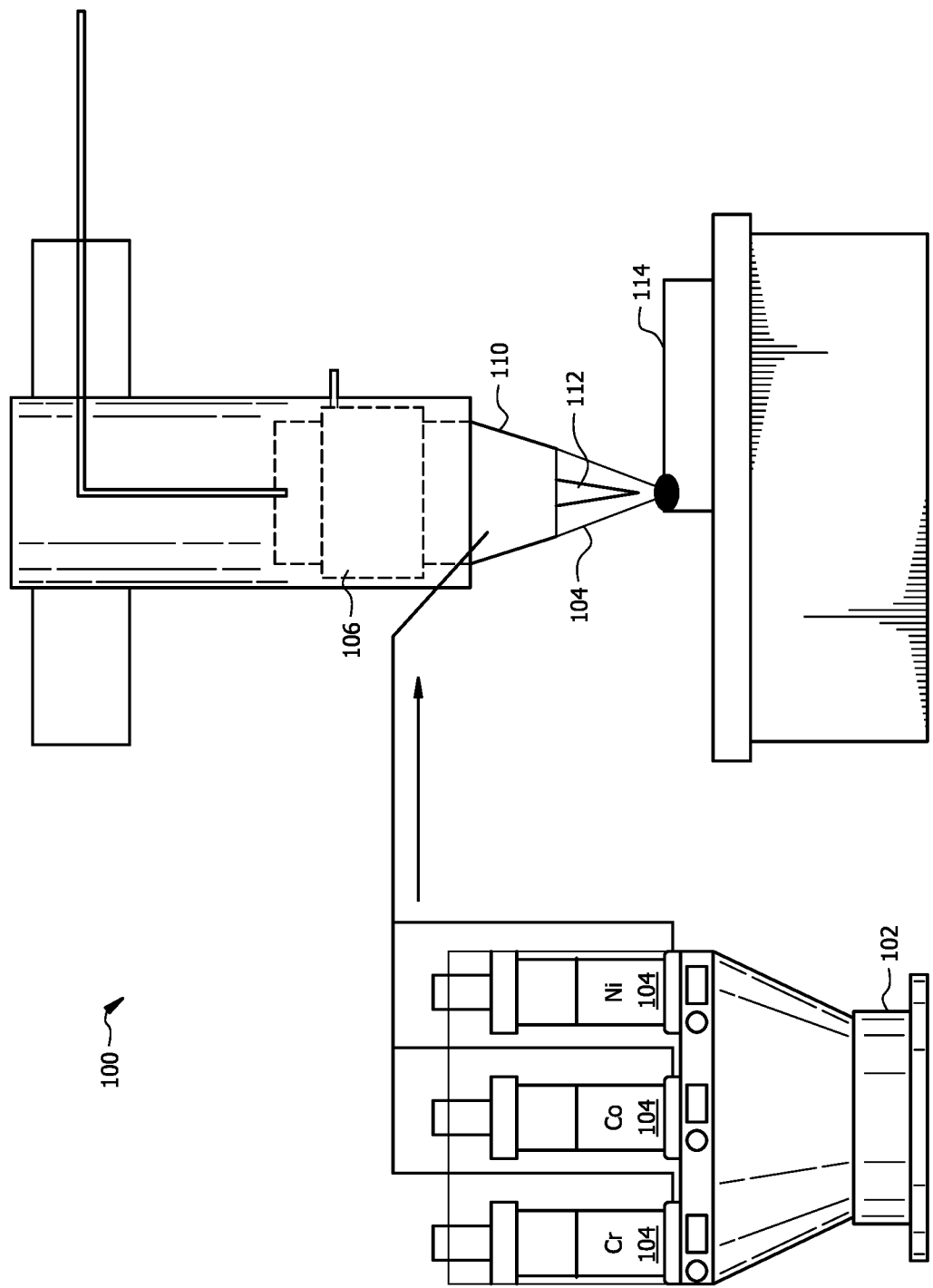
FIG. 1 is a diagram illustrating an example energy deposition system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

It should be noted that when the term "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of each numerical value. For example, if the numerical value is "about 80%," then it can be 80%+/−5%, equivalent to 75% to 85%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

The present disclosure provides for systems and methods for producing a layered metal comprising an intrinsic resistance to hydrogen induced cracking (HIC). The systems and methods may provide a layered metal designed to suppress hydrogen diffusion, the initiation of hydrogen induced cracks at surfaces, and the propagation in the bulk without affecting other bulk properties.

Phase composition and microstructure may affect determinations of material behavior. Conventional alloys may rely on optimizing processing parameters to achieve a uniform microstructure. This may improve the alloy properties as arbitrary nonuniformities may act as defect creation sites. Processing techniques, such as additive manufacturing, may permit precise introduction and control of engineered nonuniformities in the microstructure. For example, different layers may be produced with different compositions and/or microstructures in the material, which may impart new functional characteristics to the material without affecting the bulk behavior. Materials designed with these processing techniques may be termed as functionally graded materials (FGMs), where treating microstructure as a variable dependent on position, alternative material characteristics may be incorporated in a single component leading to optimum performance for specific applications. FGMs may be layered with two or more discrete layers of varying composition. FGMs may also be continuous variation of the composition. FGMs may also be a combination of layered and continuous variation where there is a continuous variation at the two or more discrete layers. When atoms are arranged in a crystal, the packing may not be uniform or perfect. There may be some gaps or open spaces, termed as interstitial sites. In conventional metals, hydrogen makes use of these interstitial sites to hop from one site to another site within the metal. Compared to conventional metals, which may only have one or two major elements, high entropy alloys may contain large amounts of elements (for example, at least five). The presence of different types of atoms that differ in size and electronic structure may distort the lattice and create new packing sequences. This, in turn, may lead to the formation of new interstitial sites that, instead of promoting diffusion, traps hydrogen atoms and retard any long-distance migration of hydrogen. By adding suitable elements to increase lattice distortion, the capability of the high entropy alloys to suppress hydrogen ingress may be significantly enhanced.

The present systems and methods may produce a layered or graded microstructure that may inhibit the diffusion of hydrogen into the metal alloy and suppresses the initiation and growth of any potential hydrogen induced cracks. The characteristics required to resist HIC may not be the same for surfaces, sub-surface regions, and the bulk. The present systems and methods may allow for the creation of the required microstructural variability without introducing undesirable side effects during alloy processing.

FIG. 1 illustrates an example energy deposition system 100. The energy deposition system 100 may be configured to produce a layered metal that comprises resistance to hydrogen induced cracking. One of ordinary skill in the art may note that the present disclosure is not limited to utilizing the energy deposition system 100 to produce the layered metal. As illustrated, the energy deposition system 100 may comprise a powder feeder 102, a laser head 106, and a nozzle 110. The powder feeder 102 may comprise any suitable size, height, shape, and any combinations thereof. Further, the powder feeder 102 may comprise any suitable materials, such as metals, nonmetals, polymers, composites, and any combinations thereof. In embodiments, the powder feeder 102 may be configured to house or contain one or more powders 104 and may provide the one or more powders 104 to the laser head 106. Any suitable type of material in a powder-form may be utilized as the one or more powders 104. Without limitations, the one or more powders 104 may comprise chromium, nickel, cobalt, derivatives thereof, and any combination thereof. The powder feeder 102 may output the one or more powders 104 as well as a suitable gas to the laser head 106. Without limitations, the suitable gas may be argon.

The laser head 106 may comprise any suitable size, height, shape, and any combinations thereof. Further, the laser head 106 may comprise any suitable materials, such as metals, nonmetals, polymers, composites, and any combinations thereof. The laser head 106 may be configured to receive the one or more powders 104 and a suitable gas to produce a metal alloy 114. The laser head 106 may be configured to produce a metal alloy by producing a laser 112 to interact with the one or more powders 104. In embodiments, the laser 112 may be produced from the received suitable gas. The laser head 106 may displace the received one or more powders 104 into the nozzle 110, wherein the nozzle 110 is configured to direct the laser 112 and the one or more powders 104 out towards an external surface. As the energy deposition system 100 operates, the metal alloy 114 may be produced layer-by-layer. In embodiments, the metal alloy may be the core metal alloy (for example, core metal alloy 202 in FIGS. 2A-2B) or the skin metal alloy (for example, skin metal alloy 204 in FIGS. 2A-2B) of the disclosed layered metal (for example, layered metal 200 in FIGS. 2A-2B).

Figure 2A:
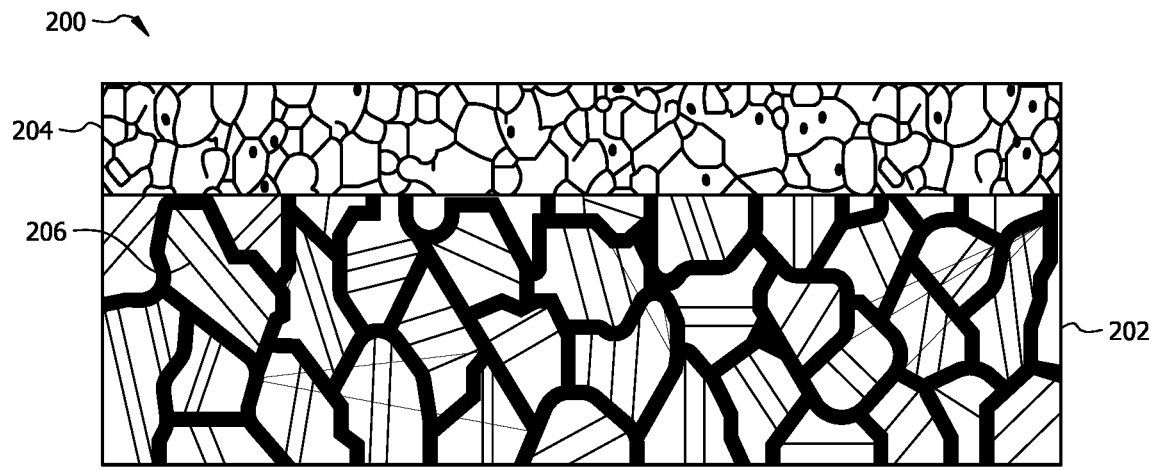
FIGS. 2A and 2B illustrate an example layered metal, according to aspects of the present disclosure.
Figure 2B:
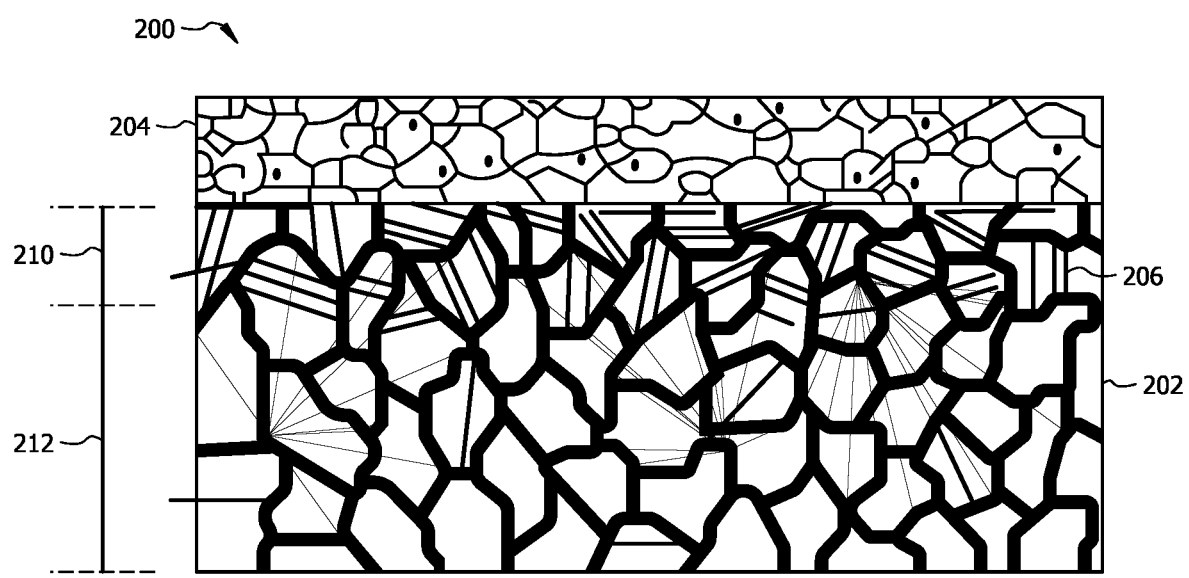

FIGS. 2A and 2B illustrate an example layered metal 200 with resistance to hydrogen induced cracking. The layered metal 200 may be a nonhomogeneous, orthotropic metal comprising layers of different entropies. The layered metal 200 may comprise a core metal alloy 202 and a skin metal alloy 204. As illustrated in both FIGS. 2A and 2B, the skin metal alloy 204 may be disposed on top of the core metal alloy 202. While the figures illustrate the skin metal alloy 204 as being disposed on top of or next to the core metal alloy 202, the disclosure is not limited to such a configuration. The layered metal 200 may be configured such that the skin metal alloy 204 is disposed as the outer layer that is exposed to hydrogen. The core metal alloy 204 may comprise of nickel as the base element. The skin metal alloy 204 may comprise an entropy greater than the core metal alloy 202. In one or more embodiments, entropy may determine a given alloy's stacking fault energy. A low entropy alloy may comprise a stacking fault energy less than 25 mJ.m-2. A high entropy alloy may comprise a stacking fault energy greater than 25 mJ.m-2, and preferably greater than 50 mJ.m-2. In these embodiments, the core metal alloy 202 may be a low entropy alloy, and the skin metal alloy 204 may be a high entropy alloy. Without limitations, a low entropy alloy may comprise an entropy of about 8.4 J/mol*K or lower, and a high entropy alloy may comprise an entropy of about 11.5 J/mol*K or higher. With a low stacking fault energy, the microstructure of that alloy may generate a greater density of twinned boundaries 206 when the alloy is subjected to plastic deformation. In contrast, a microstructure with high stacking fault energy may not generate twinned boundaries 206 during plastic deformation. Twinned boundaries may occur when two crystals of the same type intergrow so that only a slight misorientation exists between them. The twinned boundary may be considered as a coherent twin boundary, a mirror twin boundary, a twist twin boundary, a tilt twin boundary. The twinned boundary may be characterized as a low angle grain boundary where the misorientation is less than about 20 degrees or a lower angle grain boundary where the misorientation is less than about 10 degrees. As illustrated, the core metal alloy 202 may comprise twinned boundaries 206 after being subjected to plastic deformation. FIG. 2A illustrates an embodiment wherein the core metal alloy 202 may be subjected to plastic deformation, such as cold rolling. FIG. 2B illustrates another embodiment wherein the core metal alloy 202 may be subjected to plastic deformation. With reference to FIG. 2B, a surface treatment may be applied to a first portion 210 of the core metal alloy 202. In this embodiment, the twinned boundaries 206 may be generated solely within the first portion 210. A second portion 212 of the core metal alloy 202 may be unaffected by the surface treatment and may not comprise twinned boundaries 206. With reference to both FIGS. 2A and 2B, the layered metal 200 may comprise a plurality of elements, wherein the presence of the plurality of elements may increase lattice distortion to suppress hydrogen ingress.

In one or more embodiments, the core metal alloy 202 is a lower entropy alloy than the skin metal alloy 204. In embodiments, the core metal alloy 202 may comprise a face centered cubic crystalline structure. In embodiments, the core metal alloy 202 may comprise nickel, chromium, and cobalt in equimolar proportions. In embodiments, the core metal alloy 202 may comprise iron, aluminum and/or boron at a concentration lower than 0.5 wt %. In one or more embodiments, the core metal alloy 202 may comprise iron, aluminum and/or boron at a concentration between about 0.01 wt % to about 0.5 wt %. In embodiments, the core metal alloy 202 may comprise a stacking fault energy of 25 mJ/m$^2$ or lower, wherein the stacking fault energy of the core metal alloy 202 may be designed such that it generates a greater density of twinned boundaries 200 when subjected to plastic deformation. In one or more embodiments, the core metal alloy 202 may be produced by directed energy deposition and with a suitable heat treatment to restore chemical homogeneity.

In one or more embodiments, other lower entropy alloy compositions, solution strengthened, or precipitation hardened Ni-base superalloys may be used as the core metal alloy 202. In embodiments, the core metal alloy 202 may comprise nickel, cobalt, and vanadium in an approximate equimolar proportion. In embodiments, the core metal alloy 202 may enhance the formation of twinned boundaries 200. In embodiments wherein the core metal alloy 202 is a solution strengthened Ni-base superalloy, the core metal alloy 202 may comprise the following elements at a greater weight percentage than 2 wt %: nickel, chromium, iron, molybdenum, niobium, and tantalum. In embodiments wherein the core metal alloy 202 is a solution strengthened Ni-base superalloy, the core metal alloy 202 may comprise a minimum content of nickel at approximately 57 wt % and may comprise approximately 0 wt % of boron or aluminum. In embodiments wherein the core metal alloy 202 is a precipitation hardened Ni-base superalloy, the core metal alloy 202 may comprise the following elements at a greater weight percentage than 2 wt %: nickel, chromium, iron, molybdenum, niobium, and tantalum. In embodiments wherein the core metal alloy 202 is a precipitation hardened Ni-base superalloy, the core metal alloy 202 may comprise a minimum content of nickel at approximately 50 wt %, a maximum content of boron at 0.05 wt %, and a maximum content of aluminum at 1.5 wt %.

In one or more embodiments, the skin metal alloy 204 is a higher entropy alloy than the core metal alloy 202. In embodiments, the skin metal alloy 204 may comprise a face centered cubic crystalline structure. In embodiments, the skin metal alloy 204 may comprise the following elements at a greater weight percentage than 5 wt %: nickel, aluminum, cobalt, chromium, and iron. In those embodiments, there may be a content of at least 6.6 wt % aluminum. In embodiments, the skin metal alloy 204 may comprise a content of boron between about 0.1 wt % and about 0.25 wt % such that the combination of boron and aluminum may induce lattice distortion. In embodiments, the skin metal alloy 204 may suppress the diffusion of hydrogen in the material. In embodiments, the skin metal alloy 204 may comprise a stacking fault energy of about 50 mJ/m$^2$ or higher, wherein the stacking fault energy of the skin metal alloy 204 may be designed such that the formation of twinned boundaries 200 is prevented during processing. In embodiments, the skin metal alloy 204 may be formed as an outer layer by directed energy deposition on a plastically deformed and heat-treated core metal alloy 202.

In one or more embodiments, the skin metal alloy 204 may have a body centered cubic crystalline structure or combination of body and face centered cubic crystalline structure. In embodiments, the skin metal alloy 204 may comprise the following elements at a greater weight percentage than approximately 5 wt %: nickel, aluminum, chromium, iron, and cobalt, with the aluminum content being at least 11.1 wt %.

In one or more embodiments, the surfaces of the layered metal 200 may comprise a lower density of twinned boundaries 200 than the bulk (for example, the interior) of the layered metal 200. Without limitations the twinned boundaries 200 may be measured by transmission electron microscopy. The lower density of twinned boundaries 200 at the surfaces may inhibit the initiation of hydrogen induced cracks. The bulk or interior of the layered metal 200 may induce twinning by having a high density of twinned boundaries 200. The increased density of twinned boundaries 200 in the bulk may inhibit the propagation of any hydrogen induced cracks.

Figure 3:
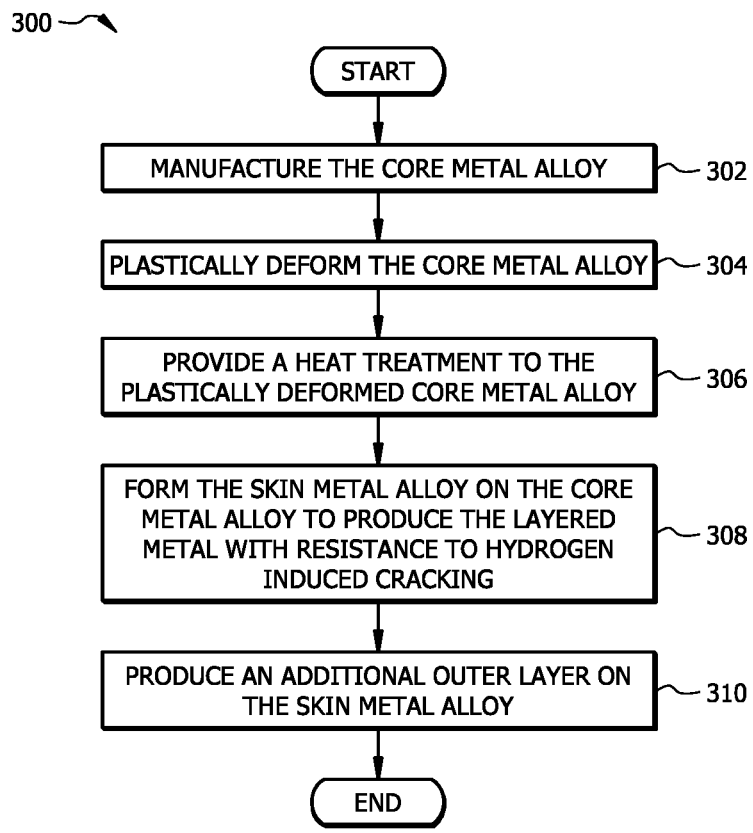
FIG. 3 is a diagram illustrating an example method of production of the layered metal of FIGS. 2A and 2B, according to aspects of the present disclosure.

FIG. 3 is a flow diagram illustrating an example method 300 of producing the layered metal 200 of FIGS. 2A and 2B. The method 300 may begin at step 302 where the core metal alloy 202 (referring to FIGS. 2A and 2B) may be manufactured by the energy deposition system 100 (referring to FIG. 1). The energy deposition system 100 may produce the core metal alloy 202 layer-by-layer. In one or more embodiments, the core metal alloy 202 may be produced or manufactured through any other suitable means. Without limitations, the core metal alloy 202 may be produced through additive manufacturing, selective laser melting, selective laser sintering, electron beam melting, wire and arc additive manufacturing, cold spray, casting or any means of hot working or cold working, forging, rolling, drawing, extrusion, and any combination thereof. In embodiments, each of the aforementioned suitable means may be combined with a suitable heat treatment process.

At step 304, the core metal alloy 202 may be plastically deformed. Without limitations, the core metal alloy 202 may be plastically deformed through cold rolling, extrusion, swedging, high pressure torsion, accumulative roll-bonding, multi-directional forging, twist extrusion, cyclic extrusion and compression, repetitive corrugation and straightening, equal channel angular pressing, and any combination thereof. In one or more embodiments, a deformation technique or process may be surface-specific, such as deep-cold rolling, laser shock peening, shot-peening, hammer-peening, and any combinations thereof. With reference to an embodiment using cold rolling, deformation techniques or processes may be used with a final heat treatment to recover the phase composition and grain size of the original microstructure of the core metal alloy 202 before undergoing plastic deformation.

At step 306, a heat treatment may be provided to the core metal alloy 202 after undergoing the plastic deformation. As previously disclosed, heat treatments may be provided to recover the phase composition and grain size of the microstructure of the core metal alloy 202 before undergoing a step or sub-step of plastic deformation.

At step 308, the skin metal alloy 204 (referring to FIGS. 2A and 2B) may be produced by the energy deposition system 100 (referring to FIG. 1) to form the layered metal 200 (referring to FIGS. 2A and 2B) with resistance to hydrogen induced cracking. The energy deposition system 100 may produce the skin metal alloy 204 layer-by-layer. The skin metal alloy 204 may be formed directly on an outer layer of the core metal alloy 202. In one or more embodiments, the skin metal alloy 204 may be produced or manufactured through any other suitable means. Without limitations, the skin metal alloy 204 may be produced through additive manufacturing, selective laser melting, selective laser sintering, electron beam melting, wire and arc additive manufacturing, cold spray, physical or chemical vapor deposition, thermal spray, electrodeposition, molecular beam epitaxy, and any combination thereof. In embodiments, each of the aforementioned suitable means may be combined with a suitable heat treatment process to recover the microstructure of the skin metal alloy 204.

At step 310, an additional outer layer may be applied to the skin metal alloy 204 to produce the layered metal 200. The additional outer layer may comprise of a suitable nanomaterial, such as reduced graphene oxide, metals, and any combination thereof. In one or more embodiments, the additional outer layer may comprise of MAX phases, including ternary carbides or nitrides such as $Ti_2AlN$. In embodiments, MAX phases may be a group of layered ternary metal carbides, nitrides, and carbonitrides. MAX phases may reference to the chemical composition: $M_{n+1}AX_n$ (n=1, 2, or 3), where M is an early transition metal, A is an A group element, and X is carbon and/or nitrogen. The additional outer layer may be a coating of a ceramic material, such as $Al_2O_3$. In one or more embodiments, the additional outer layer may be formed using additive manufacturing or conventional physical or chemical vapor deposition techniques.

Figure 4:
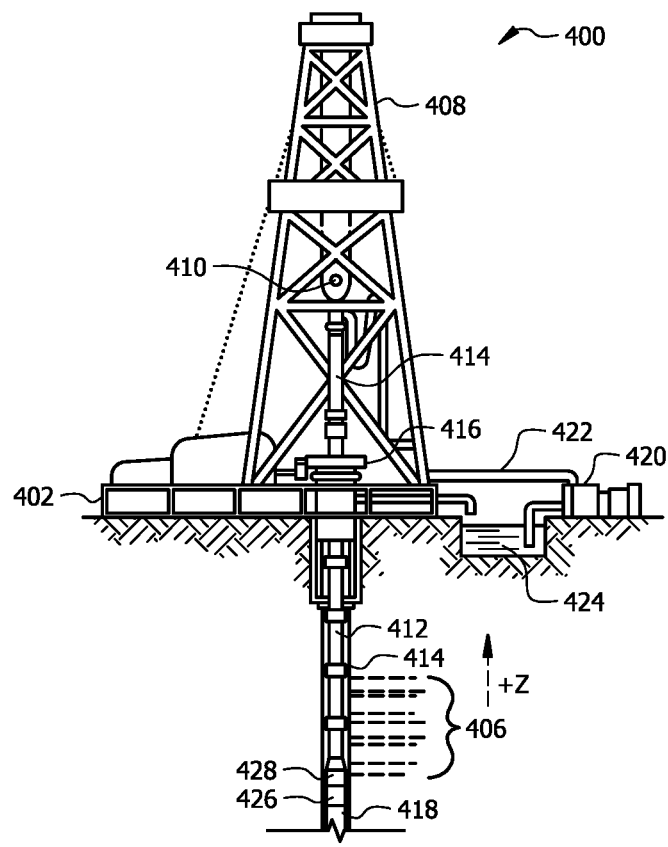
FIG. 4 is a schematic diagram of a drilling system at a well site, according to one or more aspects of the present disclosure.

FIG. 4 is a schematic diagram of an exemplary drilling system 400 that may employ the principles of the present disclosure, according to one or more embodiments. As illustrated, the drilling system 400 may include a drilling platform 402 positioned at the surface and a wellbore 404 that extends from the drilling platform 402 into one or more subterranean formations 406. In other embodiments, such as in an offshore drilling operation, a volume of water may separate the drilling platform 402 and the wellbore 404. Even though FIG. 4 depicts a land-based drilling platform 402, it will be appreciated that the embodiments of the present disclosure are equally well suited for use in other types of drilling platforms, such as offshore platforms, or rigs used in any other geographical locations. The present disclosure contemplates that wellbore 404 may be vertical, horizontal or at any deviation.

The drilling system 400 may include a derrick 408 supported by the drilling platform 402 and having a traveling block 410 for raising and lowering a conveyance 412, such as a drill string. A kelly 414 may support the conveyance 412 as it is lowered through a rotary table 416. A drill bit 418 may be coupled to the conveyance 412 and driven by a downhole motor and/or by rotation of the conveyance 412 by the rotary table 416. As the drill bit 418 rotates, it creates the wellbore 404, which penetrates the subterranean formations 406. A pump 420 may circulate drilling fluid through a feed pipe 422 and the kelly 414, downhole through the interior of conveyance 412, through orifices in the drill bit 418, back to the surface via the annulus defined around conveyance 412, and into a retention pit 424. The drilling fluid cools the drill bit 418 during operation and transports cuttings from the wellbore 404 into the retention pit 424.

The drilling system 400 may further include a bottom hole assembly (BHA) coupled to the conveyance 412 near the drill bit 418. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one acoustic logging device 426, which may comprise one or more transmitters capable of transmitting one or more acoustic signals into the surrounding one or more subterranean formations 406.

As the drill bit 418 extends the wellbore 404 through the formations 406, the acoustic logging device 426 may continuously or intermittently transmit signals and receive back signals relating to a parameter of the formations 406, for example, impulse signal such as Wicker wavelet, Blackman pulse or its higher order time derivatives, as well as chirp signals, etc. The acoustic logging device 426 and other sensors of the MWD and LWD tools may be communicably coupled to a telemetry module 428 used to transfer measurements and signals from the BHA to a surface receiver (not shown) and/or to receive commands from the surface receiver. The telemetry module 428 may encompass any known means of downhole communication including, but not limited to, a mud pulse telemetry system, an acoustic telemetry system, a wired communications system, a wireless communications system, or any combination thereof. In certain embodiments, some or all of the measurements taken at the acoustic logging device 426 may also be stored within the acoustic logging device 426 or the telemetry module 428 for later retrieval at the surface upon retracting the conveyance 412. With reference to the present disclosure and without limitations, the layered metal 200 (referring to FIGS. 2A and 2B) may be utilized for downhole tubing, casing, drill pipe, tool joints, wirelines, components of valves and related equipment items, landing nipples, wellhead components, vessels, heat exchangers, and any combination thereof. The layered metal 200 may be utilized for oilfield tubulars (for example, including housings, mandrels, tubing, shunt tubes), in tools for flow diverters (for example, including wyes, multilateral junctions, cross over tools, sand screens), in tools for flow control (for example, including packers, flow control valves, inflow control valves, inflow control devices, subsurface safety valves, surface safety valves, rate limiting valves, sleeves, baffles), and any combinations thereof. In embodiments, the layered metal 200 may be used as part of a wellbore installation. The wellbore installation may be a completion for producing a wellbore and may include screens, production tubing, flow control valves, mandrels, subsurface safety valves, flow control valves, shunt tubes, wyes, fracturing tools, and flow diversion components like packers. The wellbore installation may be a service tool for installing components into a wellbore and may including a service string of tubing, cross over tools, gravel packing tools, stimulation tools, flow passageways. The layered metal 200 may be used for production, for injection, and for gas storage.

Figure 5:
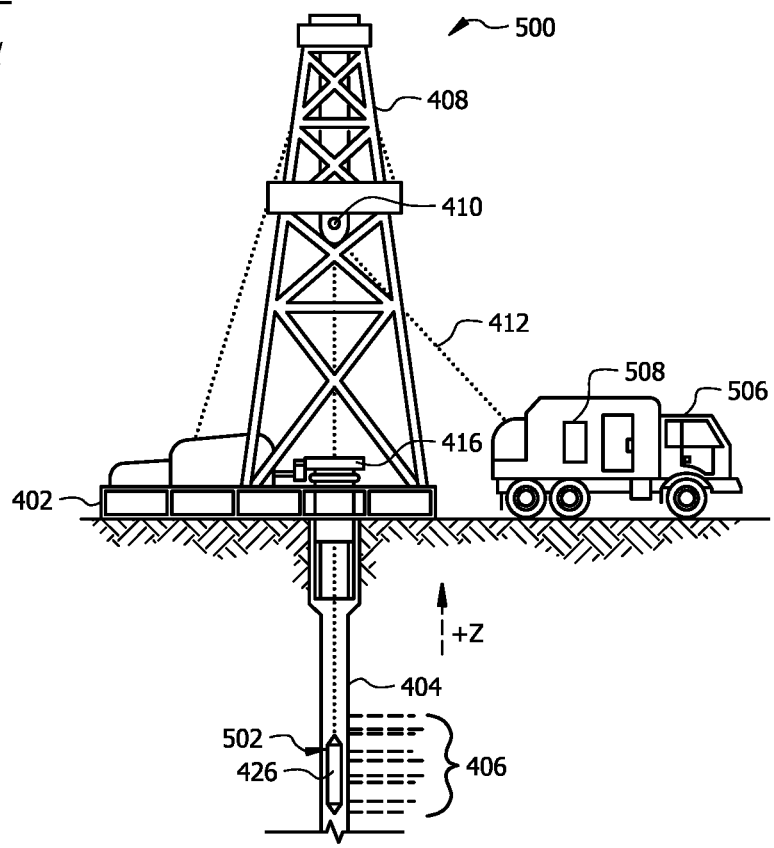
FIG. 5 is a schematic diagram of a wireline system at a well site, according to one or more aspects of the present disclosure.

At various times during the drilling process, the conveyance 412 may be removed from the wellbore 404, as shown in FIG. 5, to conduct measurement/logging operations. More particularly, FIG. 5 depicts a schematic diagram of an exemplary wireline system 500 that may employ the principles of the present disclosure, according to one or more embodiments. Like numerals used in FIGS. 4 and 5 refer to the same components or elements and, therefore, may not be described again in detail. As illustrated, the wireline system 500 may include a wireline instrument sonde 502 that may be suspended into the wellbore 404 by another conveyance 412, such as a wireline cable. The wireline instrument sonde 502 may include the acoustic logging device 426 described above, which may be communicably coupled to the conveyance 412. In some embodiments, the acoustic logging device 426 is configured to emit acoustic signals to the walls of the wellbore 404 and through the one or more subterranean formations 406 and to detect the returning acoustic data signals. The returning acoustic data signals are altered from the original acoustic signals based on the mechanical properties of the one or more subterranean formations 406, such as compressional velocity, shear velocity, and the like. Thus, the acoustic data signals carry this data and can be filtered and/or processed to obtain the formation data.

The conveyance 412 may include conductors for transporting power to the wireline instrument sonde 502 and also to facilitate communication between the surface and the wireline instrument sonde 502. A logging facility 506, shown in FIG. 5 as a truck, may collect measurements from the acoustic logging device 426, and may include an information handling system 508 for controlling, processing, storing, and/or visualizing the measurements gathered by the acoustic logging device 426. The information handling system 508 may be communicably coupled to the acoustic logging device 426 by way of the conveyance 412. In one or more embodiments, the information handling system 508 may be disposed about any suitable location in the drilling system 400 (referring to FIG. 1) and/or in the wireline system 500. In alternate embodiments, information handling system 508 may be located remotely from the system 400. The information handling system 508 may be directly or indirectly coupled to any one or more components of the drilling system 400 and/or the wireline system 500. With reference to the present disclosure and without limitations, the layered metal 200 (referring to FIGS. 2A and 2B) may be utilized for downhole tubing, casing, drill pipe, tool joints, wirelines, components of valves and related equipment items, landing nipples, wellhead components, vessels, heat exchangers, and any combination thereof. The layered metal 200 may be utilized for oilfield tubulars, as tools for flow diversion, as tools for flow control, and any combinations thereof.

An embodiment of the present disclosure is a layered metal with resistance to hydrogen induced cracking, comprising a core metal alloy, wherein the core metal alloy comprises twinned boundaries, wherein the core metal alloy has undergone plastic deformation and a heat treatment, wherein the core metal alloy comprises nickel and cobalt; and a skin metal alloy disposed on the core metal alloy, wherein the skin metal alloy comprises an entropy greater than the core metal alloy, wherein the core metal alloy comprises a greater density of twinned boundaries than the skin metal alloy, wherein the skin metal alloy comprises a stacking fault energy of at least about 50 mJ/m2, wherein the skin metal alloy comprises iron, aluminum, and boron.

In one or more embodiments described in the preceding paragraph, wherein the core metal alloy comprises nickel, chromium, and cobalt in approximate equimolar proportions. In one or more embodiments described above, wherein the core metal alloy comprises nickel, cobalt, and vanadium in approximate equimolar proportions. In one or more embodiments described above, wherein the twinned boundaries of the core metal alloy are disposed in a first portion of the core metal alloy, wherein a second portion of the core metal alloy is unaffected by a surface treatment and does not comprise the twinned boundaries. In one or more embodiments described above, wherein the core metal alloy comprises iron, aluminum, and boron each at a concentration lower than about 0.5 wt %. In one or more embodiments described above, wherein the core metal alloy is a solution strengthened Ni-base superalloy, wherein the core metal alloy comprises nickel, chromium, iron, molybdenum, niobium, and tantalum at a weight percentage greater than 2 wt %, wherein the core metal alloy comprises a minimum content of nickel at 57 wt % and does not comprise boron or aluminum. In one or more embodiments described above, wherein the core metal alloy is a precipitation hardened Ni-base superalloy, wherein the core metal alloy comprises nickel, chromium, iron, molybdenum, niobium, and tantalum each at a weight percentage greater than 2 wt %, wherein the core metal alloy comprises a minimum content of nickel at 50 wt %, a maximum content of boron at 0.05 wt %, and a maximum content of aluminum at 1.5 wt %. In one or more embodiments described above, wherein the core metal alloy comprises a stacking fault energy of less than or equal to about 25 mJ/m$^2$. In one or more embodiments described above, wherein the skin metal alloy comprises nickel, aluminum, cobalt, chromium, and iron each at a weight percentage greater than 5 wt %, wherein the skin metal alloy comprises at least 6.6 wt % of aluminum. In one or more embodiments described above, wherein the skin metal alloy comprises boron between about 0.1 wt % and about 0.25 wt % such that the combination of boron and aluminum induces lattice distortion. In one or more embodiments described above, wherein the skin metal alloy comprises nickel, aluminum, cobalt, chromium, and iron each at a weight percentage greater than 5 wt %, wherein the skin metal alloy comprises at least 11.1 wt % of aluminum. In one or more embodiments described above, wherein the skin metal alloy comprises boron between about 0.1 wt % and about 0.25 wt % such that the combination of boron and aluminum induces lattice distortion. In one or more embodiments described above, wherein the skin metal alloy comprises a face centered cubic crystalline structure, a body centered cubic crystalline structure, or a combination thereof.

Another embodiment of the present disclosure is a method for producing a layered metal with resistance to hydrogen induced cracking, comprising: producing a core metal alloy, wherein the core metal alloy comprises nickel and cobalt; plastically deforming the core metal alloy; applying a heat treatment to the core metal alloy after plastic deformation to recover a phase composition and grain size of a microstructure of the core metal alloy prior to the plastic deformation; and forming a skin metal alloy on the core metal alloy to produce a layered metal with resistance to hydrogen induced cracking.

In one or more embodiments described in the preceding paragraph, wherein producing the core metal alloy comprises of using directed energy deposition through an energy deposition system. In one or more embodiments described above, wherein forming the skin metal alloy comprises of using directed energy deposition through an energy deposition system. In one or more embodiments described above, wherein plastically deforming the core metal alloy comprises of cold rolling the core metal alloy to produce twinned boundaries. In one or more embodiments described above, wherein plastically deforming the core metal alloy is directed to a surface of the core metal alloy to produce twinned boundaries in a first portion of the core metal alloy, wherein plastically deforming the core metal alloy comprises of a process selected from a group consisting of deep-cold rolling, laser shock peening, shot-peening, and hammer-peening. In one or more embodiments described above, wherein producing the core metal alloy comprises of a process selected from a group consisting of additive manufacturing, selective laser melting, selective laser sintering, electron beam melting, wire and arc additive manufacturing, cold spray, casting, means of hot working or cold working, forging, rolling, drawing, extrusion, and any combination thereof. In one or more embodiments described above, wherein forming the skin metal alloy comprises of a process selected from a group consisting of additive manufacturing, selective laser melting, selective laser sintering, electron beam melting, wire and arc additive manufacturing, cold spray, physical or chemical vapor deposition, thermal spray, electrodeposition, molecular beam epitaxy, and any combination thereof.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A layered metal with resistance to hydrogen induced cracking, comprising:
   a core metal alloy, wherein the core metal alloy comprises twinned boundaries, wherein the core metal alloy has undergone plastic deformation and a heat treatment, wherein the core metal alloy comprises nickel and cobalt; and
   a skin metal alloy disposed on the core metal alloy, wherein the skin metal alloy comprises an entropy greater than the core metal alloy, wherein the core metal alloy comprises a greater density of twinned boundaries than the skin metal alloy, wherein the skin metal alloy comprises a stacking fault energy of at least about 50 mJ/m$^2$, wherein the skin metal alloy comprises iron, aluminum, and boron.

2. The layered metal with resistance to hydrogen induced cracking of claim 1, wherein the core metal alloy comprises nickel, chromium, and cobalt in approximate equimolar proportions.

3. The layered metal with resistance to hydrogen induced cracking of claim 1, wherein the core metal alloy comprises nickel, cobalt, and vanadium in approximate equimolar proportions.

4. The layered metal with resistance to hydrogen induced cracking of claim 1, wherein the twinned boundaries of the core metal alloy are disposed in a first portion of the core metal alloy, wherein a second portion of the core metal alloy is unaffected by a surface treatment and does not comprise the twinned boundaries.

5. The layered metal with resistance to hydrogen induced cracking of claim 1, wherein the core metal alloy comprises iron, aluminum, and boron each at a concentration lower than about 0.5 wt %.

6. The layered metal with resistance to hydrogen induced cracking of claim 1, wherein the core metal alloy is a solution strengthened Ni-base superalloy, wherein the core metal alloy comprises nickel, chromium, iron, molybdenum, niobium, and tantalum at a weight percentage greater than 2 wt %, wherein the core metal alloy comprises a minimum content of nickel at 57 wt % and does not comprise boron or aluminum.

7. The layered metal with resistance to hydrogen induced cracking of claim 1, wherein the core metal alloy is a precipitation hardened Ni-base superalloy, wherein the core metal alloy comprises nickel, chromium, iron, molybdenum, niobium, and tantalum each at a weight percentage greater than 2 wt %, wherein the core metal alloy comprises a minimum content of nickel at 50 wt %, a maximum content of boron at 0.05 wt %, and a maximum content of aluminum at 1.5 wt %.

8. The layered metal with resistance to hydrogen induced cracking of claim 1, wherein the core metal alloy comprises a stacking fault energy of less than or equal to about 25 mJ/m$^2$.

9. The layered metal with resistance to hydrogen induced cracking of claim 1, wherein the skin metal alloy comprises nickel, aluminum, cobalt, chromium, and iron each at a weight percentage greater than 5 wt %, wherein the skin metal alloy comprises at least 6.6 wt % of aluminum.

10. The layered metal with resistance to hydrogen induced cracking of claim 9, wherein the skin metal alloy comprises boron between about 0.1 wt % and about 0.25 wt % such that the combination of boron and aluminum induces lattice distortion.

11. The layered metal with resistance to hydrogen induced cracking of claim 1, wherein the skin metal alloy comprises nickel, aluminum, cobalt, chromium, and iron each at a weight percentage greater than 5 wt %, wherein the skin metal alloy comprises at least 11.1 wt % of aluminum.

12. The layered metal with resistance to hydrogen induced cracking of claim 11, wherein the skin metal alloy comprises boron between about 0.1 wt % and about 0.25 wt % such that the combination of boron and aluminum induces lattice distortion.

13. The layered metal with resistance to hydrogen induced cracking of claim 12, wherein the skin metal alloy comprises a face centered cubic crystalline structure, a body centered cubic crystalline structure, or a combination thereof.

14. The layered metal with resistance to hydrogen induced cracking of claim 1, wherein the twinned boundaries of the core metal alloy are disposed in a first portion of the core metal alloy.

15. The layered metal with resistance to hydrogen induced cracking of claim 14, wherein a second portion of the core metal alloy is unaffected by a surface treatment and does not comprise the twinned boundaries.

16. The layered metal with resistance to hydrogen induced cracking of claim 1, wherein the core metal alloy is a precipitation hardened Ni-base superalloy.

17. The layered metal with resistance to hydrogen induced cracking of claim 1, wherein the core metal alloy is a solution strengthened Ni-base superalloy that comprises nickel, chromium, iron, molybdenum, niobium, and tantalum.

18. The layered metal with resistance to hydrogen induced cracking of claim 1, wherein the core metal alloy is a precipitation hardened Ni-base superalloy that comprises a minimum content of nickel at 50 wt %.

19. The layered metal with resistance to hydrogen induced cracking of claim 1, wherein the core metal alloy is a precipitation hardened Ni-base superalloy that comprises a maximum content of boron at 0.05 wt %.

20. The layered metal with resistance to hydrogen induced cracking of claim 1, wherein the core metal alloy is a precipitation hardened Ni-base superalloy that comprises a maximum content of aluminum at 1.5 wt %.

\* \* \* \* \*